April 23, 1968  E. M. TRAMMELL, JR  3,379,402
VEHICLE LICENSE PLATE HOLDERS
Filed Dec. 31, 1964  2 Sheets-Sheet 1
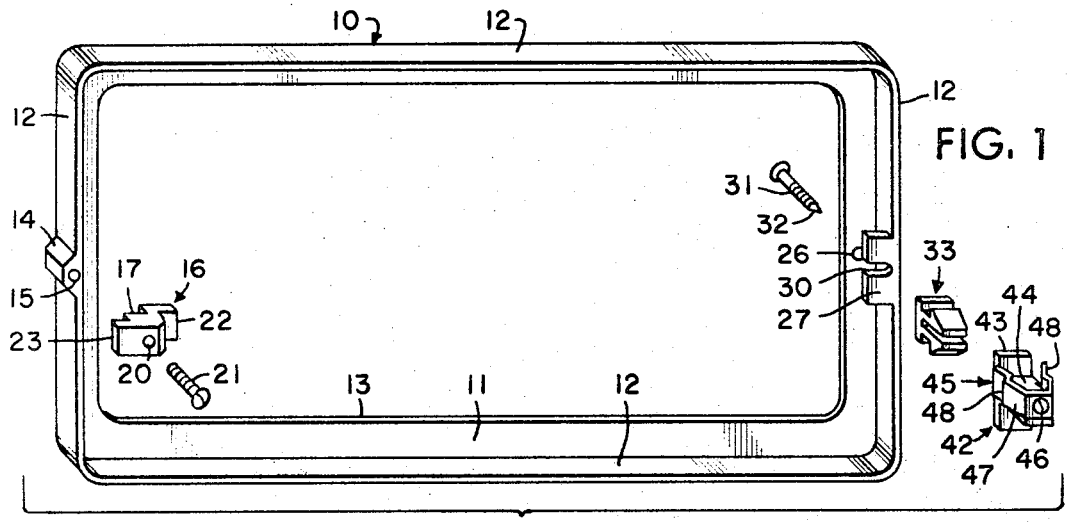
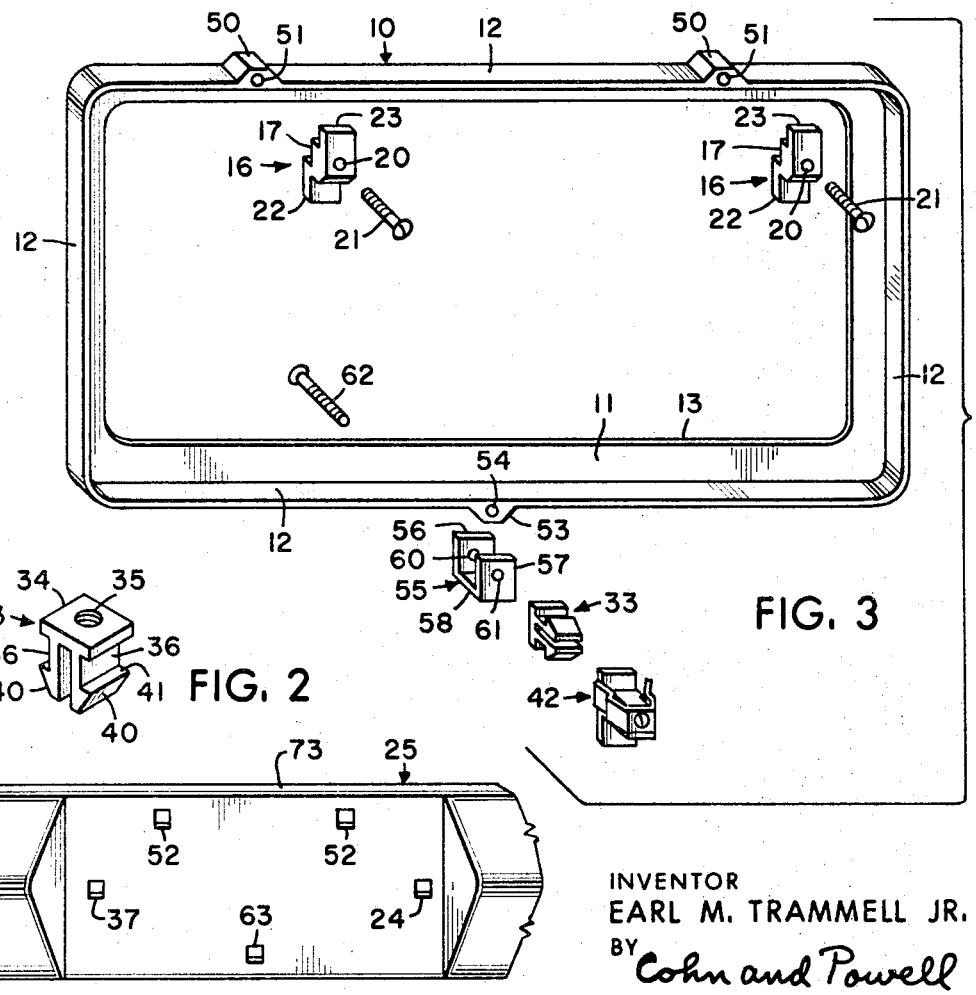
INVENTOR
EARL M. TRAMMELL JR.
BY Cohn and Powell
ATTORNEYS April 23, 1968   E. M. TRAMMELL, JR   3,379,402
VEHICLE LICENSE PLATE HOLDERS
Filed Dec. 31, 1964   2 Sheets-Sheet 2
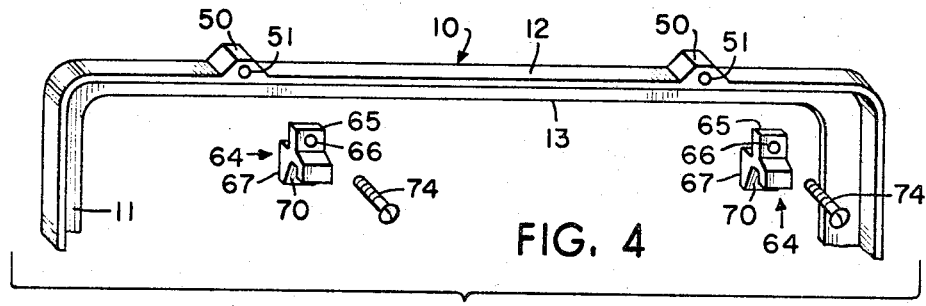
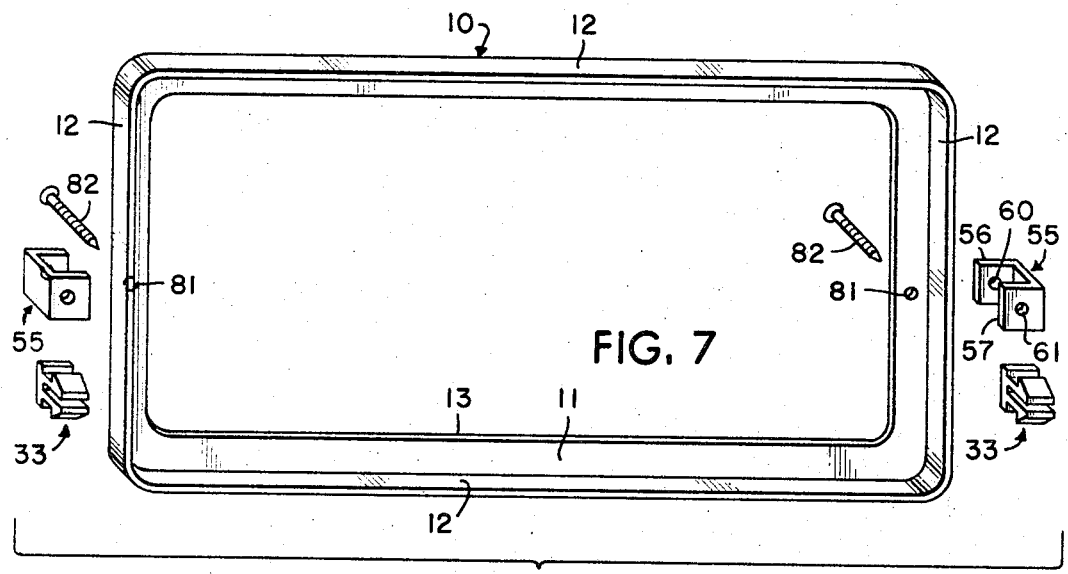
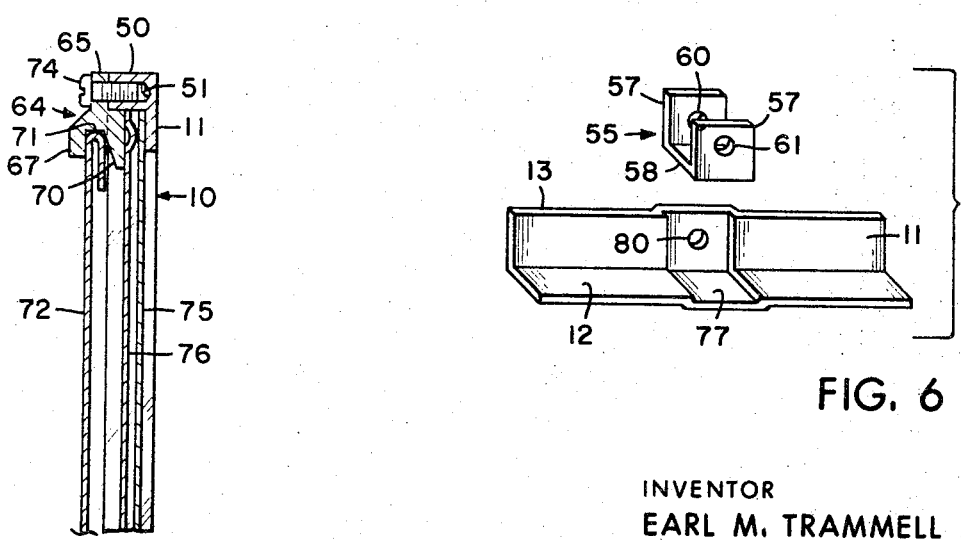
INVENTOR
EARL M. TRAMMELL JR.
BY
Cohn and Powell
ATTORNEYS

3,379,402
VEHICLE LICENSE PLATE HOLDERS
Earl M. Trammell, Jr., 39 Salem Estates Drive,
La Due, Mo. 64758
Filed Dec. 31, 1964, Ser. No. 422,799
7 Claims. (Cl. 248—488)

ABSTRACT OF THE DISCLOSURE

The holder includes a frame adapted to receive a license plate. The frame is provided with hook members which secure it to a support and in addition retain the plate within the frame. A puncture screw connects the plate to the frame and also serves to attach forked snap fasteners to the frame, the snap fasteners permitting the connection of the holder to a support member without the use of screws or bolts. The holder may be removed from the support member simply by squeezing the forked parts of the snap fastener together.

---

This invention relates generally to improvements in automobile or vehicle license plate holders, and more particularly to improved devices of this type which provide a quick and efficient installation and removal of license plates.

It is an important objective to achieve a license plate holder that can be conveniently and advantageously utilized by automobile dealers to install all licenses readily without the use of tools, without any handling of loose screws, nuts and the like, and without the need for a skilled mechanic. The automobile dealer saves on installation time and on labor cost.

An important object is realized in that the improved license plate holders provide a snap-on and snap-off feature to enable fast attaching and detaching of dealer plates. For the first time the dealer can justify the use of a holder with dealer plates. Heretofore, the use of frames and holders only added to the time and to the complicated steps of installing and removing such dealer plates, thereby making such use too expensive.

Many states now issue license plates for use over a period of several years, and it is in the interest of the automobile owner to protect his plates from normal weathering and from damage by enclosing and shielding them in a suitable license plate holder. The license plate holders, presently disclosed, enable automobile users to remove and replace their plates easily without the need for tools and without and harmful defacement of the plates.

Another important object is attained by the structural arrangement of the component parts comprising the license plate holder which causes an automatic piercing of the license plate by a securing screw in attaching the plate to the holder, without any visual or harmful defacement of the plate. Under some circumstances, the means for attaching the holder to a supporting member such as a bumper or a hinge plate adapted to cover the gas cap is fixed to the holder by the same puncture screw.

Still another important objective is afforded by the provision of a combination of hook and snap fasteners that greatly facilitates installation and removal of the license plate holders.

Yet another important object is realized by the provision of a snap nut that is expendable automatically upon insertion into a compatible opening formed in the supporting member so as to be locked in place, the nut having an off-center threaded hole into which a screw is fitted incident to attachment of the holder to the supporting member, the off-center hole being adjusted to different positions upon turning the nut in its opening in order to provide an adjustment in the installation fit.

An important object is attained by accomplishing an attachment of the holder by connections directly with the holder frame to the supporting member of the automobile, and not by any connections through the conventional holes provided in the license plate. The automobile manufacturers will design or coordinate their supporting members such as bumpers, to accommodate this new type of license plate frame.

It is an important object to provide a license plate holder that is simple and durable in construction, economical to manufacture and assemble, efficient in operation, and which can be utilized by anyone with little or no instruction.

The foregoing and numerous other objects and advantages of the invention will more clearly appear from the following detailed description of several embodiments, particularly when considered in connection with the accompanying drawings, in which:

FIG. 1 is a perspective view of the license plate holder illustrating one embodiment of the attachment means;

FIG. 2 is a perspective view of the snap nut;

FIG. 3 is a perspective view of the license plate holder illustrating another embodiment of the attachment means;

FIG. 4 is a fragmentary perspective view showing a modification of the hook structure to be utilized in the embodiment of FIG. 3;

FIG. 5 is a fragmentary, cross sectional view of the attachment of the modified hook construction of FIG. 4;

FIG. 6 is a fragmentary, perspective view of a modified mounting of the clip to be used in the embodiments of FIGS. 3–5 and 7;

FIG. 7 is a perspective view of the license plate holder illustrating another embodiment of the attachment means, and FIG. 8 is a fragmentary perspective view of a supporting member such as a bumper.

Referring now by characters of reference to the drawings, and first to FIG. 1, it is seen that one embodiment of the license plate holder includes a substantially rectangularly shaped frame indicated at 10 constructed of an integral angle cross section having a rectangular front flange 11 and rearwardly extending side flanges 12. The front flange 11 defines a rectangularly shaped opening 13 through which the license plate (not shown) can be viewed when the plate is located within the frame 10.

As is conventional, a transparent plastic sheet constituting a window (not shown) is disposed across the face of the license plate and within the frame 10 to provide a protective shield across the frame opening 13. The plastic window and license plate are seated against the front flange 11 with their peripheral margins located closely adjacent to and confined by the side flanges 12.

One side frame flange 12 includes an enlarged protuberance 14 in which is provided a tapped, incomplete hole 15 at the rear side of the frame 10. A hook generally indicated at 16 and constituting a fastening means is fixed to this side of the frame. More particularly, the hook 16 includes an inner face 17 that overlies the rear face of protuberance 14. A hole 20 extends through the hook 16 and is aligned with the tapped hole 15 when the hook 16 is positioned. A screw 21 extends through the hook hole 20 and is threadedly attached to the protuberance 14 in the tapped hole 15, the screw 21 fixing the hook 16 to the frame 10.

The hook 16 includes an inner arm portion 22 that extends inwardly of the associated side flange 12 and behind the license plate when the plate is located within the frame. The hook 16 includes a hook portion 23 that extends outwardly of the associated flange 12 and is recessed from the hook face 17 in order for the hook portion 23 to fit within a compatible opening 24 (FIG.

8) and engage behind a support member 25 such as bumper. The support member can be a hinge plate that is commonly used to cover a gas cap on an automobile, or can be any suitable element on the vehicle. The hook 16 fixes one side of the frame 10 to the supporting member.

The opposite side of frame 10 is provided with another attachment means for fixing that side of the frame 10 to the supporting means 25. A tapped hole 26 is formed in the front flange 11. An inturned flange 27 is formed integrally with the side flange 12 and is located immediately behind the tapped hole 26, the inturned flange 27 being disposed behind the plastic window and the license plate when the window and plate are located within the frame 10. Formed in the inturned flange 27 is a substantially U-shaped recess 30 aligned with the tapped hole 26. A puncture screw 31 having a tapered tip 32 is threadedly connected in the tapped hole 26, punctures the plastic window and license plate, and extends through the inturned flange recess 30. It is seen that the puncture screw 31 fixes the plate to the frame 10. The window and license plate are punctured near their edges and are not visually defaced.

A snap nut generally indicated at 33, and best shown in FIG. 2, is preferably constructed of a plastic material such as nylon or the like. The snap nut 33 includes a base portion 34 in which a threaded hole 35 is provided at the end of the nut. A pair of resilient arm portions 36 are formed integrally with the base portion 34, the resilient arm portions 36 constituting expandable means adapted to interfit a compatible opening 37 (FIG. 8) of the supporting member 25. The ends of the resilient arm portions 36 are provided with inclined cam surfaces 40 and hook shoulders 41.

To connect the snap nut 33 to the supporting member 25, the resilient arm portions 36 are inserted into the compatible opening 37, the cam surfaces 40 engaging the margin defining opening 37 to flex the arm portions 36 inwardly toward each other. When fully inserted, the arm portions 36 will expand resiliently and snap outwardly to engage the hook shoulders 41 against the rear side of the support member 25 to preclude unintentional withdrawal of the snap nut 33. Of course, the nut 33 can be disassembled from the supporting member 25 by digitally pressing the resilient arm portions 36 toward each other to release the hook shoulders 41, and then withdrawing the nut 33 from the opening 37.

In attaching the frame 10 to the support member 25, the screw 31 is fastened to the snap nut 33 by threaded connection within the tapped hole 35, after the snap nut 33 has been inserted into its opening 37 and attached to the supporting member 25. When the screw 31 is drawn up tight, the inturned flange 27 will engage and seat on the base portion 35 of the snap nut 33. Consequently, this side of the frame 10 is securely fastened to the supporting member 25.

Briefly, to attach the license plate holder 10 of FIG. 1, the hook 16 is attached to one side of the frame by screw 21 and the snap nut 33 is inserted into its cooperating opening 37 of the supporting member 25. Then the hook 16 is attached to the supporting member 25 by insertion of the hook portion 23 into its coacting opening 24, and the opposite end of the frame 10 is brought down against the supporting member. The puncture screw 31 is threadedly attached to the frame hole 26 to cause a puncturing of the plastic window and license plate retained within the frame 10, and the screw 31 is threadedly attached to the snap nut 33 by threaded engagement with nut hole 35. The license plate holder is now securely attached to the supporting member.

It will be noted that in this embodiment, the screw 31, upon attachment to the nut 33, will extend between the resilient arm portions 36 to preclude any flexing action toward each other, and thereby preclude any disengagement of the snap nut 33 from the supporting member 25.

It will be noted that the hole 35 in the snap nut 33 is laterally offset from the center axis of the snap nut 33 so that the distance between the connection of the screw 31 with the nut hole 35 and the connection of the hook 16 with the opening 24 can be varied slightly to compensate for any small differences found in individual installations, such as would be caused by a bending or denting of a bumper or gas cap cover hinge plate. This adjustment feature is achieved by turning the snap nut 33 to different positions within its cooperating opening 37 to either shorten or lengthen the distance between such connections.

In lieu of utilizing the snap nut 33, a snap fastener referred to at 42 (FIG. 1) can be used. This snap fastener 42 constituting a fastening means, includes a base portion 43 adapted to seat against the inturned flange 27 and a post 44 on which is mounted a resilient, substantially U-shaped spring 45. The spring 45 is secured by screw 46 to the post 44 and includes resilient spring arms 47 flexible toward and away from each other. For reasons which will later appear, the spring arms 47 include hook shoulders 48. The rear side of the snap fastener 42 is provided with a threaded hole (not shown) similar to hole 35 in the snap nut 33 which is adapted to receive threadedly the screw 31, whereby to fix the snap fastener 42 to the inturned flange 27.

To install the embodiment disclosed in FIG. 1 utilizing the snap fastener 42, the plastic window and license plate are disposed within the frame 10, and the hook 16 is secured to one side of the frame by screw 21. The puncture screw 31 is threadedly attached to the frame 10 by engagement in the tapped hole 26, the puncture screw 31 puncturing the plastic window and the license plate and threadedly engaging the snap fastener 42 seated on the inturned flange 27. The snap fastener 42 is retained to the frame 10 by the screw 31.

First, the hook 16 is attached to the supporting member 25 by insertion of the hook portion 23 within its cooperating opening 24, and the opposite frame end is swung toward the supporting member 25 until the snap fastener 42 operatively interfits its compatible opening 37, the arms 47 of the U-shaped spring 45 flexing toward each other upon insertion and snapping outwardly to move the hook shoulders 48 behind the supporting surface when fully inserted to preclude accidental disengagement and withdrawal of the snap fastener 42. Thus it is seen that the license plate holder is secured to the supporting member 25.

To disengage the holder described above, the outturned ends 49 of the spring arms 47 located in front of the opening 37 can be digitally pressed toward each other to clear the hook shoulders 48 from the margins of the compatible support member opening 37 to enable withdrawal of the snap fastener 42. When the snap fastener 42 is withdrawn, the holder can be swung outwardly to disengage the opposite hook 16.

The use of the snap fastener 42 having the spring construction described above is especially advantageous for automobile dealers for snapping license plate holders on and off quickly and easily. These holders can be readily used for dealer plates.

Of course, the arms 47 of the U-shaped spring 45 can be cut short at the hook shoulders 48 so that there will be no ends 49 accessible for digital movement of the spring to effect release of the snap fastener 42. In this event, the hook shoulders 48 of the U-shaped spring 45 will engage the rear surface of the supporting member 25. To release the snap fatsener 42 under these conditions, the screw 46 must be first unthreaded to disassemble the spring 45. When the spring 45 is removed, the snap fastener can be withdrawn from its cooperating opening 37.

Another embodiment of the license plate holder is disclosed in FIG. 3. In this embodiment, the frame 10 has the same general configuration as the frame previously described in FIG. 1 in that the frame 10 includes a substantially rectangular front flange 11 and rearwardly extending side flanges 12, the front flange defining a substantially rectangular opening 13.

The upper flange 12 is provided with a pair of enlarged protuberances 50, each of which is provided with an incomplete, tapped hole 51 formed in the rear side. The protuberances 50 are spaced along the upper flange 12 so that one of such protuberances 50 is located near each end of the frame 10.

A hook 16, having a construction similar or identical to the construction of hook 16 of FIG. 1, is attached to each protuberance 50. More specifically, each hook 16 is located with its inner face 17 contiguous to the rear face of the protuberance 50 so that the inturned arm portion 22 extends within the frame 10 and behind the license plate when located in the frame 10, and so that the opposite hook portion 23 extends upwardly beyond the upper flange 12. A screw 21 extends through the hole 20 formed in the hook 16 and threadedly engages the protuberance hole 51, whereby to fasten the hook 16 to the frame 10.

The hook portions 23 of the pair of hooks 16 are adapted to interfit compatible openings 52 formed in the support member 25. Again, it will be importantly noted that these openings 52 can be formed in the bumper or in the hinge plate covering the gas cap or in any other suitable supporting member utilized in the vehicle. The bumper of FIG. 8 is disclosed for illustrative purposes only in this regard with respect to all of the disclosed embodiments.

The bottom flange 12 of the frame 10 includes a centrally located, outwardly projecting protuberance 53 having a hole 54 formed completely therethrough.

A substantially U-shaped clip generaly indicated at 55 includes spaced arms 56 and 57 interconnected by cross piece 58, the arms 56 and 57 having aligned holes 60 and 61 respectively. To position the U-shaped clip 55, the arms 56 and 57 embrace the frame 10 about the protuberance 53 so that the clip holes 60 and 61 are aligned with the protuberance hole 54. One clip arm 56 overlies the front surface of the front flange 11, while the other clip arm 57 is located behind the license plate when the plate is disposed in the frame 10. The clip 55 is fastened by placement of a screw 62 through the aligned clip holes 60 and 61 and the protuberance hole 54. Either the protuberance hole 54 or one of the clip holes 60 or 61 is tapped to enable the screw 62 to be drawn up tight.

This U-shaped clip 55 can be operatively associated with a snap nut 33 previously described. When the snap nut 33 is located in a compatible opening 63 formed in the support member 25, the frame 10 can be secured to the support member by threadedly attaching the screw 62 to the snap nut 33 by threaded engagement with the tapped hole 35 formed in the snap nut 33.

To assemble and install the license plate holder of FIG. 3 described above, the hooks 16 are fastened to the upper flange 12 by fastening the hooks 16 to the protuberances 50 with screws 21, such screws 21 extending through the hook holes 20 and threadedly engaging the protuberance holes 51. The snap nut 33 is snapped into its compatible opening 63. After the window and license plate are located in the frame 10, the clip 55 is secured to the frame 10 by placing the clip 55 over the protuberance 53 and fastening the clip to the protuberance 53 by threaded insertion of screw 62. Then the hooks 16 are engaged with the supporting member 25 by insertion of the hook portions 23 into the compatible openings 52. The bottom edge of the frame 10 is swung downwardly so that the clip 55 is aligned with the snap nut 33 located within the support member opening 63. Then the screw 62 is tightened to attach the clip 55 and its associated frame 10 to the snap nut 33 by threadedly engaging the tapped hole 35 in the snap nut 33. It is seen that the license plate holder is firmly secured to the supporting member 25.

Again, a snap fastener 42 can be used in lieu of the snap nut 33 as previously described in the embodiment of FIG. 1. In this modification, the base 43 of the snap fastener 42 is seated against the rear side of the clip arm 57 so as to align a threaded hole in the rear side of the snap fastener 42 with the clip arm hole 61. The screw 62 extending through the clip arms 56 and 57 and through the protuberance 53 threadedly engages in the snap fastener hole and secures the snap fastener 42 to the clip 55.

To install the license plate holder of the type disclosed in FIG. 3 utilizing a snap fastener 42, the hooks 16 are fastened to the supporting member 25 in a manner previously described by inserting the hook portions 23 into the compatible openings 52. Then the bottom of the frame 10 is swung downwardly so as to insert the snap fastener 42 into its compatible opening 63 formed in the supporting member 25. The arms 47 of the U-shaped spring 45 will flex inwardly upon insertion and then snap outwardly upon complete insertion so that the hook shoulders 48 of the spring arms 47 engage behind the supporting member 25 to preclude unintentional withdrawal. Thus it is seen that the license plate holder is secured to the supporting member 25.

To disassemble the license plate holder, the outer ends 49 of the U-shaped spring 25 can be digitally depressed toward each other to disengage the hook shoulders 48 from behind the supporting member 25 to permit withdrawal of the snap fastener 42 from its compatible opening 63. This type of snap fastener 42 is particularly adapted for use by dealers in installing or removing dealer plates from their automobiles. For the individual installing plates on his automobile, the arms 47 of the U-shaped spring 45 are cut short at the hook shoulders 48 so that the hook shoulders 48 will engage the rear surface of the supporting member 25 upon insertion into the opening 63. Under these conditions, in order to disassemble the license plate holder, the screw 46 must first be removed in order for the U-shaped spring 45 to be removed. Then the snap fastener 42 can be withdrawn from its opening 63.

Instead of using a pair of the hooks 16 as disclosed in FIG. 3, hooks 64 of the type shown in FIG. 4 can be utilized. In this embodiment, the hooks 64 include tabs 65 adapted to overlie the rear faces of the protuberances 50, the tabs 65 being provided with holes 66 alignable with the incomplete, tapped holes 51 formed in such protuberances 50. The hooks 64 include hook portions 67 provided with downwardly opening recesses 70 adapted to receive a portion of the supporting member 25, such as the top edge 71 of either a hinge plate 72 (FIG. 5) or the top edge 73 of the bumper disclosed in FIG. 8.

To assemble the license plate holder of FIG. 4, the hooks 64 are located with the tabs 65 over the protuberances 50 and with the holes 66 aligned with the protuberance holes 51. Then, suitable screws 74 extend through the tab holes 66 and threadedly engage the protuberance holes 51 to secure the hooks 64 in place. Of course, the plastic window 75 and the license plate 76 are located within the frame 10, as is best seen in FIG. 5. The hook portions 67 overlie the rear side of the plastic window 75 and plate 76.

To install, the hooks 64 are merely slipped over the top edge 71 of the hinge plates 72 or the top edge 73 of a bumper or over any margin of any supporting member 25 so that such margin is received within the hook recesses 70. Then the lower end of the license frame holder is swung downwardly as described previously with respect to the embodiment of FIG. 3 so as to enable securement of a clip 55 by a screw 62 to a snap nut 33 located within a compatible opening 63 formed in the supporting member 25, or to enable snapping engagement of a snap fastener 42, secured and carried by the clip 55, within such compatible opening 63.

FIG. 6 illustrates a modification of the connection of the U-shaped clip 55 to the frame 10. In this embodiment, the lower flange 12 and the front flange 11 are provided with a recess 77 in which the clip 55 seats. It will be importantly noted that the clip 55 is located completely within the angle of the frame 10 rather than having one arm embrace the outer front surface of the front flange 11 as indicated in FIG. 3. The cross piece 58 of clip 55 seats in that portion of recess 77 formed in the lower flange 12 while the clip arm 56 seats in that portion of recess 77 formed in the rear side of front flange 11. The front flange 11 is provided with a hole 80 aligned with the holes 60 and 61 formed in the clip arms 56 and 57 respectively. Either the frame hole 80 or the clip hole 60 in arm 56 is tapped to threadedly engage and receive a puncture screw of the type indicated at 31 in FIG. 1.

To assemble the license plate holder utilizing the clip embodiment of FIG. 6, the clip 55 is seated in its cooperating recess 71 as described above. Then the plastic window and the license plate are positioned within the frame 10 and between the clip arms 56 and 57. It will be assumed that the hooks which may be of the type indicated at 16 in FIG. 3 or 64 in FIG. 4 are attached to the top of the frame as described previously. If a snap nut 33 is to be utilized in association with the clip 55, the snap nut 33 is inserted into the compatible opening 63 in the supporting member 25. Then the puncture screw 31 is threadedly engaged in the aligned holes 81 and 60 to puncture the plastic window and the license plate, the puncture screw 31 extending through the other opening 61 in the rear clip arm 57. After the hooks 16 are inserted into compatible openings 52 in the supporting member 25 or the hooks 64 are fitted over the supporting margin of the supporting member 25, depending upon the type of hooks utilized in the frame holder, the frame holder is swung downwardly so as to align the rear clip arm 57 with the snap nut 33 disposed in the opening 63. Then, the puncture screw 31 is tightened to fix the clip 55 securely to the snap nut 33, the puncture screw 31 threadedly engaging the threaded hole 35 in such snap nut 33.

Of course, a snap fastener 42 can be secured to the rear clip arm 57 by threaded engagement of the puncture screw 31 into a suitable threaded hole formed in the rear side of such snap fastener 42 in the manner previously described with respect to the embodiments of FIGS. 1 and 3 among others. When the snap fastener 42 is utilized, the bottom side of the license plate holder is swung downwardly so that the snap fastener 42 can be inserted into the compatible opening 63 of the supporting member 25. The U-shaped spring 45 snaps into place in the manner previously described and now understood.

Still another embodiment of the license plate holder is illustrated in FIG. 7. In this embodiment, the continuous, substantially rectangular angle frame 10 includes the substantially rectangular front flange 11 and rearwardly extending side flanges 12. At opposite sides of the frame 10, the front flange 11 is provided with holes 81 adapted to receive coacting puncture screws 82. A U-shaped clip 55 embraces each side of the frame 10, one clip arm 56 overlying the front surface of the front flange 11 while the other clip arm 57 projects inwardly behind the front flange 11 and behind the license plate received within the frame 10. The clip 55 is provided with holes 60 and 61 formed in the clip arms 56 and 57 respectively, the clip holes 60 and 61 being aligned with the screw hole 81 formed in the front flange 11.

The clips 55 disclosed in FIG. 7 can be utilized in association with either the snap nuts 33 or snap fasteners 42 or a combination thereof. It will be assumed first that snap nuts 33 are utilized. In this event, as described previously, the snap nuts 33 are inserted and retained in suitable openings 24 and 37 formed in the supporting member 25. Then, the plastic window and license plate are seated within the frame 10 and the clips 55 are disposed about the opposite ends of the frame 10. The puncture screws 82 are passed through the aligned flange openings 81 and the clip openings 60 and 61 to fasten the clips 55 to the frame 10. Either the flange hole 81 or the clip hole 60 is threaded to enable the puncture screw 82 to be tightened. Upon tightening the screws 82, the plastic window and the license plate are punctured by such screws 82 to fasten the window and license plate securely to the frame 10. To install the frame 10 to the supporting member 25, the clip arms 57 are located over the snap nuts 33 so that the puncture screws 82 can be threadedly attached to such snap nuts 33 by engagement of the screws 82 in the threaded snap nut holes 35. It is seen that the license plate holder is now securely fastened in place.

In lieu of the snap nut 33, a snap fastener 42 can be associated with each or one of the clips 55 in FIG. 7. If a pair of snap fasteners 42 are utilized, the clips 55 are slipped over the opposite sides of the angle frame 10 as described previously and the puncture screws 82 are attached. The base portions 43 of the snap fasteners 42 are seated against the rear side of the clip arms 57 and are secured to the clips 55 by engagement of the puncture screws 82 into suitable threaded holes provided in the snap fasteners 42. To install the license plate holder in which a pair of snap fasteners are attached to the pair of clips 55, the license plate holder is brought into juxtaposition with the supporting member 25 to align the snap fasteners 42 with the compatible openings 24 and 37, and then the snap fasteners 42 are merely inserted through such openings 24 and 37 until the snap fasteners 42 snap into place, as is now apparent.

Of course, a snap fastener 42 can be attached to one of the clips 55 while a snap nut 33 can be fastened to the other clip 55, if desired.

Instead of the clips 55 embracing the outer surface of the front flange 11, as indicated in FIG. 7, the clips 55 can be positioned inside of the angle frame 10 by incorporating the structure disclosed in FIG. 6. In this modification, the clips 55 would not be visible from the front of the license plate holder but would be completely hidden from view.

Although the invention has been described by making detailed reference to several embodiments of the attachment means for a license plate holder, such detail is to be understood in an instructive, rather than in any restrictive sense, many variants being possible within the scope of the claims hereunto appended.

I claim as my invention:

1. A license plate holder comprising:
   (a) a frame adapted to receive a plate,
   (b) a hook carried by one side of the frame, the hook including a hooking arm adapted to secure the frame to a supporting member and an inner arm adapted to overlie and retain the plate,
   (c) A screw connected to and extending through the opposite side of the frame, the screw being adapted to connect the plate located in the frame, and
   (d) a snap fastener held to to the frame by the screw, the hook and snap fastener being adapted to secure the frame to a supporting member.

2. A license plate holder comprising:
   (a) a frame adapted to receive a plate,
   (b) a hook carried by one side of the frame the hook including a hooking arm adapted to secure the frame to a supporting member and an inner arm adapted to overlie and retain the plate,
   (c) a puncture screw connected to and extending through the opposite side of the frame, the screw being adapted to puncture the plate located in the frame, and
   (d) fastening means connectable with the screw, the hook and fastening means being adapted to secure the frame to a supporting member.

3. A license plate holder comprising:
   (a) a frame including a front flange adapted to retain the plate, (b) a hook carried by one side of the frame, the hook including a hooking arm adapted to secure the frame to a supporting member and an inner arm adapted to overlie and retain the plate,
(c) the front flange being provided with a threaded hole in the opposite side of the frame,
(d) a rear flange on the frame behind the threaded hole and adapted to retain the plate,
(e) a puncture screw threadedly connected to the front flange in the hole and extending through the rear flange, the screw being adapted to puncture the plate located in the frame to fix the plate to the frame between the front and rear flanges, and
(f) snap fastening means engageable with the screw and adapted to secure the frame to the supporting member.

4. A license plate holder comprising:
(a) a frame adapted to receive the plate,
(b) a hook carried by one side of the frame, the hook including a hooking arm adapted to attach the said one frame side to a supporting member and an inner arm adapted to overlie and retain the plate,
(c) the frame being provided with a threaded hole in the opposite side of the frame,
(d) a rear flange on the frame behind the threaded hole,
(e) a puncture screw threadedly connected to the frame in the hole and extending through the rear flange, the screw being adapted to puncture a plate located in the frame to secure the plate to the frame, and
(f) a snap fastener, including a resilient arm, connectable by the screw to the rear flange, the arm being adapted to interfit and opening in the supporting member, the arm including expandable means engaging the supporting member upon insertion into the opening, the arm being digitally sprung to permit disengagement from the opening.

5. A license plate holder comprising:
(a) a plate,
(b) a frame, including a front flange portion,
(c) a hook carried by one side of the frame, the hook retaining the plate and being adapted to secure the said one frame side to a supporting member,
(d) a U-shaped clip carried by the opposite side of the frame and including a first arm portion disposed behind the plate when located in the frame and a second arm portion engaging the front flange portion, one of said latter two portions including a threaded hole,
(e) a screw connecting the clip to the frame, the screw extending through the first arm portion, the screw engaging the threaded hole and puncturing the plate to secure the plate to the frame, and
(f) a snap fastener fixed to the first arm of the clip by the screw, the snap fastener being adapted to interfit an opening in the supporting member, the snap fastener including expandable means engageable with the supporting member upon insertion into the opening.

6. A license plate holder comprising:
(a) a frame,
(b) attachment means at one side of the frame,
(c) a puncture screw connected to and extending through the opposite side of the frame, the screw being adapted to puncture a plate located in the frame to secure the plate to the frame,
(d) a snap fastener adapted to interfit a compatible opening in a supporting member, the snap fastener being secured to the screw to fix the frame to the supporting member, and
(e) the snap fastener being provided with a threaded hole adapted to receive the screw, the threaded hole being offset from the axis of the snap fastener so as to vary selectively the distance between the attachment means and the connection of the screw in the threaded hole by turning the snap fastener on the screw.

7. A license plate holder comprising:
(a) a frame,
(b) a snap fastener at opposite sides of the frame adapted to interfit a compatible opening in a supporting member,
(c) each snap fastener being provided with a threaded hole offset from its center axis so as to vary the distance selectively therebetween by turning the snap fastener to different positions,
(d) a puncture screw connected to and extending through the opposite sides of the frame, the screw being adapted to puncture a plate located in the frame to secure the plate to the frame, and
(e) the screw engaging the threaded hole of the snap fastener to fix the snap fastener to the frame, the snap fasteners fixing the frame to the supporting member.

References Cited

UNITED STATES PATENTS

| 2,062,057 | 11/1936 | Hobby | 248—361 |
| 1,260,156 | 3/1918 | De Foreest | 40—209 X |
| 1,738,273 | 12/1929 | Anderson | 40—209 |
| 2,243,586 | 5/1941 | Treece | 248—224 |
| 2,853,818 | 9/1958 | Simon et al. | 40—209 |
| 2,910,793 | 11/1959 | Helmer et al. | 40—209 |
| 3,137,955 | 6/1964 | Villani | 40—209 |
| 3,163,392 | 12/1964 | Husted. | |

ROY D. FRAZIER, *Primary Examiner.*

CHANCELLOR E. HARRIS, *Examiner.*

R. P. SEITTER, *Assistant Examiner.*